March 28, 1967
L. C. PURSIANO ET AL
3,311,911
ELECTROMAGNETIC INDICATOR DEVICE
Filed Aug. 27, 1964
4 Sheets-Sheet 1
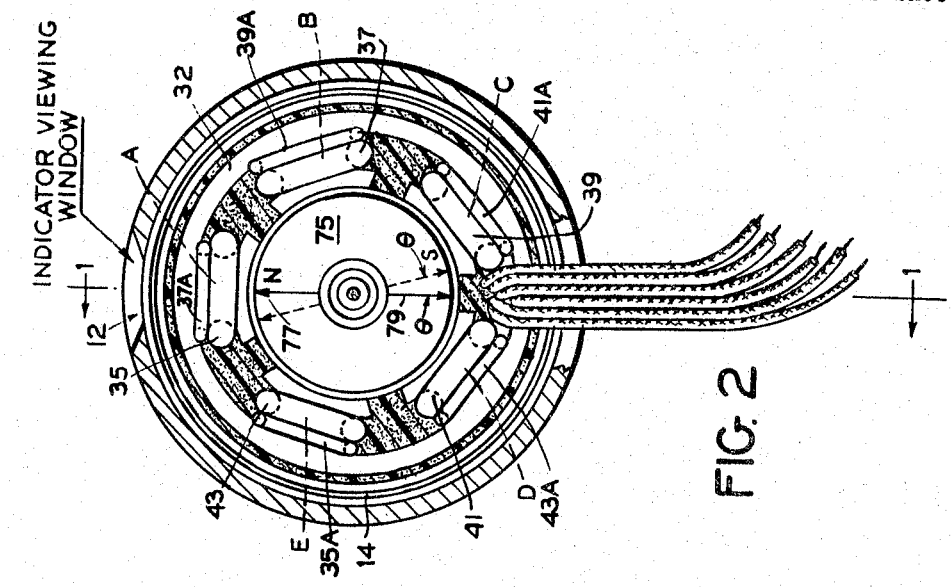
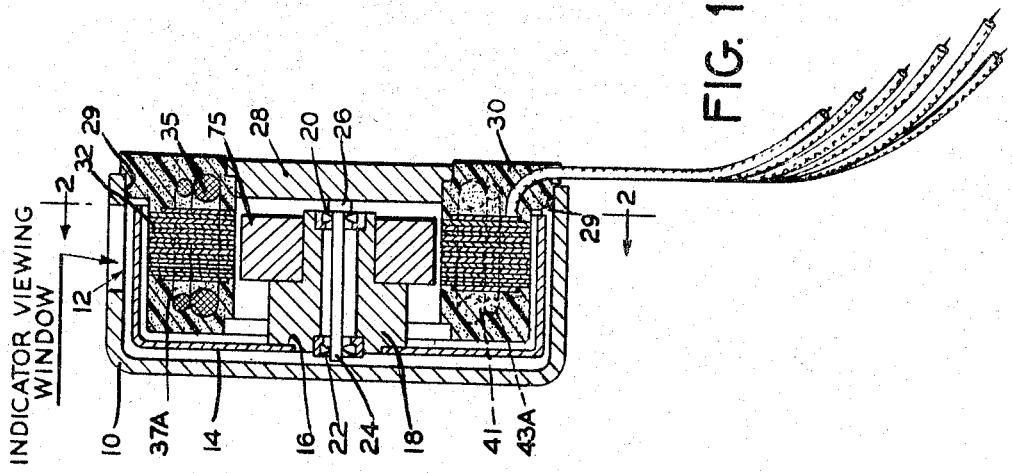
INVENTORS
LEONARD C. PURSIANO
ARNOLD H. COHEN
BY *Herbert L. Davis*
ATTORNEY

INVENTORS
LEONARD C. PURSIANO
ARNOLD H. COHEN

NUMBER CALL OUT

| SWITCH NO. | + ON | − ON |
|---|---|---|
| 1 | 35A-35 | X |
| 2 | X | 41A-41 |
| 3 | 37A-37 | X |
| 4 | X | 43A-43 |
| 5 | 39A-39 | X |
| 6 | X | 35A-35 |
| 7 | 41A-41 | X |
| 8 | X | 37A-37 |
| 9 | 43A-43 | X |
| 0 | X | 39A-39 |

ALTERNATE POLARITY EXCITATION

TABLE A

NUMBER CALL OUT

| LEAD X | POLES 43/43A | 41/41A | 39/39A | 37/37A | 35/35A | NO. |
|---|---|---|---|---|---|---|
| − |   |   |   |   | + | 1 |
| − |   |   |   | + | + | 2 |
| − |   |   |   | + |   | 3 |
| − |   |   | + | + |   | 4 |
| − |   |   | + |   |   | 5 |
| − |   | + | + |   |   | 6 |
| − |   | + |   |   |   | 7 |
| − | + | + |   |   |   | 8 |
| − | + |   |   |   |   | 9 |
| − | + |   |   |   | + | 0 |

COMMON POLARITY EXCITATION

TABLE B

FIG. 5

March 28, 1967 L. C. PURSIANO ET AL 3,311,911
ELECTROMAGNETIC INDICATOR DEVICE
Filed Aug. 27, 1964 4 Sheets-Sheet 4

INVENTORS
LEONARD C. PURSIANO
ARNOLD H. COHEN
BY
ATTORNEY

United States Patent Office 3,311,911
Patented Mar. 28, 1967

3,311,911
ELECTROMAGNETIC INDICATOR DEVICE
Leonard C. Pursiano, Ridgewood, and Arnold H. Cohen, Park Ridge, N.J., assignors to The Bendix Corporation, Teterboro, N.J., a corporation of Delaware
Filed Aug. 27, 1964, Ser. No. 392,430
6 Claims. (Cl. 340—378)

This invention relates to an electromagnetic indicator device and more particularly to improvements in an electromagnetic indicator of a type such as disclosed in U.S. application Serial No. 380,899, filed July 7, 1964, by Leonard C. Pursiano, Arnold H. Cohen, and George O. Ranes, and assigned to The Bendix Corporation; in U.S. Patent No. 3,089,131, granted May 7, 1963, to William H. Morgan, and also assigned to The Bendix Corporation, and in U.S. Patent No. 3,109,167, granted Oct. 29, 1963, to John R. MacIntyre and Raymond J. Miller, and to an electrically actuated indicator for adjustably positioning any one of a plurality of discrete numbers or symbols on a single rotating drum so as to indicate, for example, any one of ten decimal digits 0–9 or symbols, inclusive, and by electrical impulses selectively applied through six wires by either a direct positive to negative connection, negative to positive connection, or a selectively effected one or two connection of the controlled electromagnets or by an eleven wire system to selectively energize the controlling electromagnets.

In the aforenoted U.S. application Serial No. 380,899, there is shown a somewhat similar electromagnetic device in which ambiguities in the selection of indicator numbers or symbols displaced 180° may be overcome by magnetizing a permanent magnet rotor in such a manner that the North pole is displaced from the South pole by approximately 165°, i.e. one pole is magnetized in alignment with a center line while the other pole is magnetized approximately 15° off the center line. This novel feature in the arrangement shown in the aforenoted application Serial No. 380,899 served to solve the ambiguity problem, but presented certain disadvantages:

(1) The ten numbers or symbols provided on the indicator drum operated by the permanent magnet rotor would not be equally spaced from each other, due to the peculiar arrangement of the poles of the permanent magnet rotor so that, while the scale provided on the indicator drum was uniformly repetitive, it was necessary that the indicator numbers or symbols be arranged in a characteristic pattern of a space between every two number provided around the circumference of the indicator drum.

(2) Furthermore, it was found that while the ten indicator numbers or symbols on the indicator drum may be displayed upon the selective energization of the controlling electromagnets, only five of these numbers may be selectively displayed during the de-energized state of the controlling electromagnets. This condition was found to be inherent in the system disclosed by the aforenoted copending application Serial No. 380,899 because of an opposite magnetic detent action of the drum in the display of each of the two adjacent numbers or symbols due to the peculiar arrangement of the permanent magnet rotor.

An object of the invention is to provide an electromagnetic indicator device of the type described in which the disadvantages listed above may be avoided in that the ten indicator numbers or symbols may be equally spaced from each other around the periphery of the indicator drum and in which the magnetic detent action (change in position) effected by the permanent magnet rotor in passing from the excited to the unexcited station of the controlling electromagnet is effected in the same direction at each number or symbol, resulting in ten equally spaced detent positions. Thus, the ten numbers or symbols on the indicator drum may be displayed in either the energized or de-energized state of the controlling electromagnets.

Moreover, unlike the indicator described in the copending U.S. application Serial No. 380,899 in which the ambiguity problem is solved by means of a permanent magnet rotor in which one pole is magnetized approximately 15° off the center line, in the present invention the ambiguity problem is solved by means of a novel arrangement of secondary or phasing windings so that there may be used a conventional permanent magnet rotor in which the North and South poles are magnetized in alignment along the same axis and in which the magnetic detent action is effected by means of a novel arrangement of additional phasing windings. Thus, the ambiguities in the operation of the indicator drum may be eliminated by means of the novel arrangement of phasing windings, instead of through the provision of the specially magnetized permanent magnet rotor of the aforenoted U.S. application Serial No. 380,899.

Another object of the invention is to provide an electromagnetic indicator embodying a five-pole electro-magnetic assembly including a two-pole permanent magnet rotatably mounted in cooperative relation therewith and so arranged in relation to the five-pole electromagnetic assembly as to eliminate discrepancies in selectively positioning in relation to a viewing window numbers or indicating symbols borne by a rotatable indicator drum driven by the permanent magnet, in that the permanent magnet is so poled that one pole is magnetized in alignment with the other and each of the poles of the five-pole electromagnetic assembly includes in addition to a main winding a phasing winding angularly spaced therefrom and effectively energized therewith so as to provide a resultant magnetic field in which is combined the magnetic forces generated by the main and phasing windings so as to angularly displace the permanent magnet out of alignment with the dominating coacting pole of the main winding and thereby prevent ambiguity in the selective positioning of the numbers or indicating symbols borne by the drum.

Another object of the invention is to provide a magnetic indicator having a permanent magnet rotor with opposite poles in alignment one with the other and arranged in cooperative relation with angularly spaced main and phasing windings jointly energized one with the other so as to angularly displace the permanent magnet from magnetic alignment with the poles of the main winding in order that the permanent magnet may be operably positioned from one adjusted position to a diametrically opposite adjusted position relative to the five-pole electromagnetic assembly by magnetic forces applied to the poles of the permanent magnet without danger of a stalling of the permanent magnet in a dead center position.

Another object of the invention is to provide an improved simplified electromagnetic indicating apparatus including a magnetic rotor member cooperatively arranged in relation to angularly spaced main and phasing windings so as to provide a plurality of discrete angularly spaced rotor positions without the need of a magnet rotor member having out of line poles, auxiliary pole pieces or magnetic lock members such as shown in the aforenoted application or patents to prevent ambiguity in effecting the displacement of the rotor.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

In the drawings:

FIGURE 1 is a cross-sectional view of an indicator embodying the invention and taken along the lines 1—1 of FIGURE 2 and looking in the direction of the arrows.

FIGURE 2 is a sectional view of FIGURE 1 taken along the lines 2—2 of FIGURE 1 and looking in the direction of the arrows.

Figure 3:
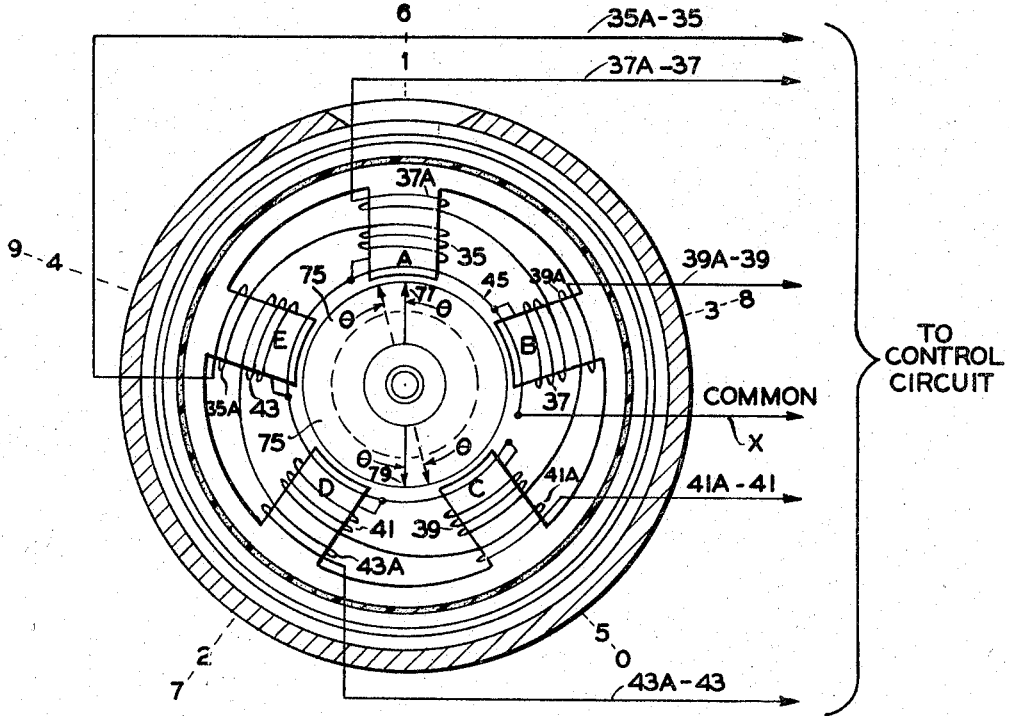
FIGURE 3 is a schematic wiring diagram of the indicator of FIGURE 2 illustrating a six-wire circuit arrangement for selectively energizing the main and phasing windings for controlling the angular position of the indicator.

FIGURE 5 illustrates tables A and B in which table A shows the mode of energization of the controlling electromagnets of the indicator of FIGURE 3 to produce different indications by the provisions of either a + to − connection or a − to + connection while table B shows a somewhat different mode of energization of the electromagnets using common polarity excitation and one or two connection of the controlling electromagnets.

Figure 6:
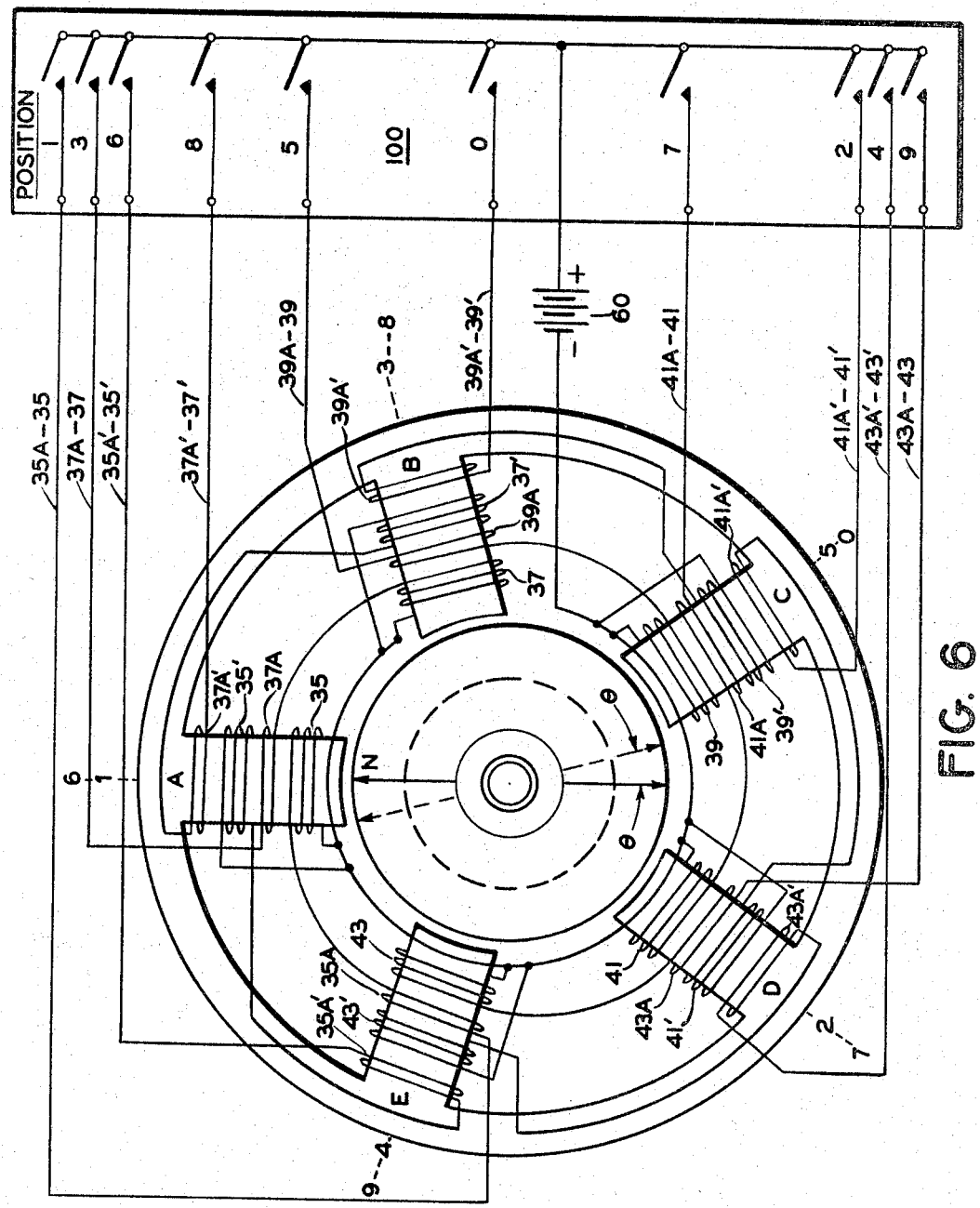

FIGURE 6 is a schematic wiring diagram of a modified form of the invention and showing an eleven-wire circuit arrangement for selectively energizing the main and phasing windings for controlling the angular position of a permanent magnet driven indicator.

Referring to the drawings of FIGURES 1, 2, and 3, an indicator constructed in accordance with the invention is shown as including a casing 10 of a generally cylindrical configuration including a window 12 in the side wall thereof through which any one of a plurality of equally spaced numbers or indicator symbols may be viewed on a rotary indicating member or drum 14.

The drum 14 is formed of a light weight nonmagnetic material such as aluminum which is centrally secured at 16 to a mounting sleeve 18 carried by jewel or other suitable bearings 20 and 22 mounted at opposite ends of the sleeve 18 and rotatably supporting the sleeve 18 on a shaft 24 which is secured at one end 26 to an end cap 28 fixedly mounted in a plastic electrical insulating block 30 which is in turn affixed to the casing 10 at an annular flange 29. The plastic electrical insulating material or block 30 may be of a suitable epoxy material and serves to encapsulate within the casing 10 a five-pole stator indicated generally in the drawing of FIGURE 1 by the numeral 32.

Projecting radially inward from the stator 32 are the poles A, B, C, D, and E, shown in FIGURES 2 and 3, and further wound about the respective poles A, B, C, D, and E are main electromagnetic windings or coils 35, 37, 39, 41 and 43, shown structurally in FIGURE 2 and diagrammatically in FIGURE 3, and further wound about the poles A, B, C, D, and E are the respective phasing windings or coils 37A, 39A, 41A, 43A, and 35A angularly spaced from and serially connected to the corresponding main coils 37, 39, 41, 43 and 35 wound on the respective poles B, C, D, E, and A. The phasing coils generate a much lesser magnetic force than the main coils, but each phasing coil combines with the corresponding serially connected main coil in generating a magnetic field slightly displaced from the pole of the main coil As shown schematically in FIGURE 3, the inner ends of each of the coils 35, 37, 39, 41, and 43 are connected to a common conductor 45 connected by a conductor X to switch contacts 47, 49, 51, 53, and 55 arranged for cooperation with two-way control switches 57A, 57B, 57C, 57D, and 57E for the electromagnetic control coils 35, 37, 39, 41, and 43 on the poles A, B, C, D, and E, as shown diagrammatically in FIGURE 4, and arranged to selectively connect the positive and negative terminals of a source of electrical energy 60 to effect the desired controlling action, as hereinafter explained.

Figure 4:
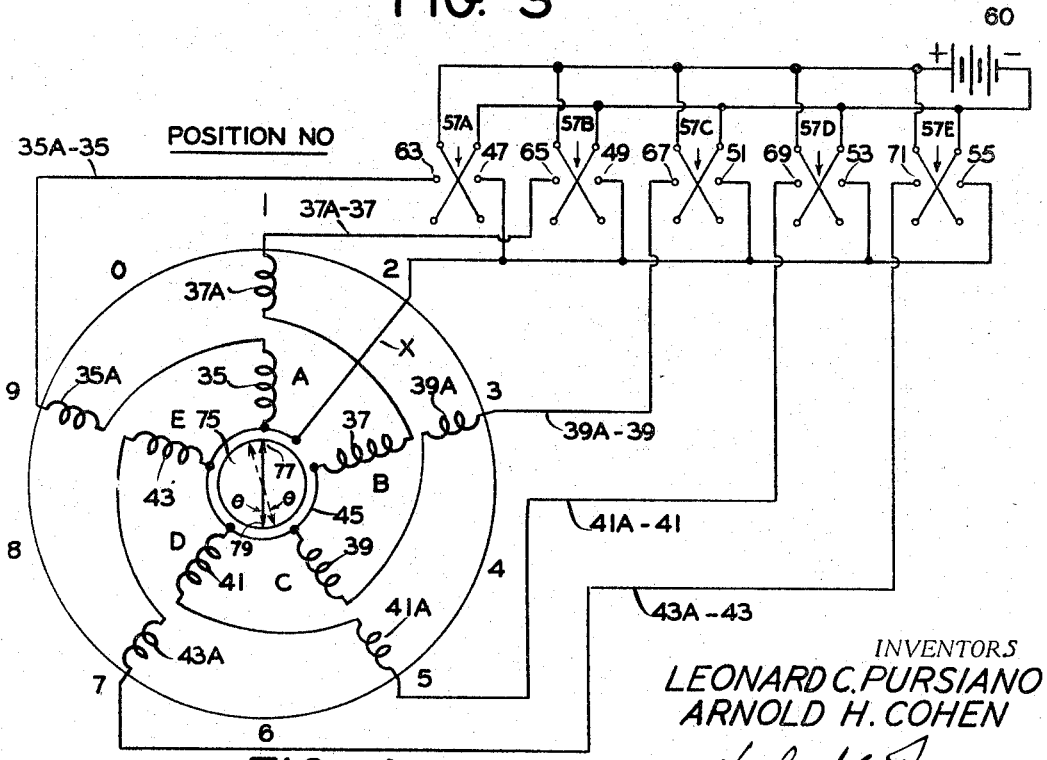
FIGURE 4 is a circuit diagram showing the switching arrangement which may be utilized to selectively energize the six-wire circuit for controlling the electromagnets including the main and phasing windings of the indicator.

In this connection, it should be noted that the five poles A, B, C, D, and E are equally angularly spaced about a rotatable permanent magnet 75 having the aligned opposed poles 77 and 79 cooperatively arranged in relation to the electromagnetic poles A, B, C, D, and E. The rotatably permanent magnet 75 is secured to the bearing sleeve 18, as shown in FIGURE 1, and the magnet 75 is so arranged that one pole 77, for example, the North pole, is magnetized in alignment with the opposite pole 79, or South pole, as indicated in FIGURES 2, 3, and 4.

The arrangement is such then that by the selective operation of the switch arms 57A, 57B, 57C, 57D, and 57E by the operator, as indicated in the table A of FIGURE 5, a direct positive to negative connection or a direct negative to positive connection of the source of electrical energy 60 to the selected main windings 35, 37, 39, 41, and 43 on the respective angularly spaced poles A, B, C, D, or E, together with the corresponding serially connected phasing windings 35A, 37A, 39A, 41A, and 43A on the corresponding angularly spaced poles E, A, B, C, D may be effected to call out the indicator number or symbol on the drum 14, as shown at table A of FIGURE 5 by the electromagnetic positioning of the drum 14 in relation to the indicator viewing window 12, shown in FIGURES 1 and 3. In this latter operation, the combined field generated by the energized main and phasing windings displaces the pole of the permanent magnet rotor 75 from alignment with the pole of the energized main winding by the angle $\theta$, as shown in dotted lines in FIGURE 3. Upon de-energization of the controlling electromagnet, the permanent magnet 75 lines up with the pole of the controlling electromagnet, as shown by the solid line arrows.

In an alternative mode of operation, a one or two connection of the controlling electromagnetic windings or coils 35, 37, 39, 41, and 43 of the poles A, B, C, D, and E, as indicated in table B of FIGURE 5 by the indicated positive (+) designation may be effected to provide the desired indication operation of the electromagnets. Alternatively, the common polarity excitation of one or two coils may be all negative if required with the common lead positive.

A feature of the invention is the novel arrangement of the phasing windings 35A–43A in angular spaced relation to the corresponding serially connected main windings 35–43 and in cooperative relation to the circular rotatable permanent magnet 75 with the opposing North and South poles 77 and 79 in alignment one with the other so that the drum 14 affixed thereto through the mounting sleeve 18 may be angularly displaced in relation to the pole of the corresopnding main winding upon energization thereof and positioned to all points without ambiguity in the operation thereof which might otherwise be the case if the main winding were energized without energization of the corresponding phasing winding bearing the subscript A.

In a third form of the invention illustrated in FIGURE 6, there is provided an eleven-wire system together with a series of control switches, indicated generally by the numeral 100 for selectively effecting energization of the main control windings 35, 37, 39, 41, and 43 wound on the poles A, B, C, D, and E, respectively, together with the phasing windings 35A, 37A, 39A, 41A, and 43A mounted on the respective poles A, B, C, D, E and serially connected to their corresponding windings 35, 37, 39, 41 and 43, as heretofore described with reference to the indicator device of FIGURE 3. In addition, in the arrangement shown in FIGURE 6, instead of reversing the polarity of energization of the aforenoted windings as in the indicator device of FIGURES 3 and 4, there are provided separate main windings 35', 37', 39', 41', and 43' wound on the poles A, B, C, D, and E, respectively, in the reverse direction from the windings 35, 37, 39, 41, and 43. In addition, there are serially connected to the respective main windings 35', 37', 39', 41', and 43', the phasing coils 35A', 37A', 39A', 41A', and 43A', wound on the respective poles E, A, B, C, D in the reverse direction from that of the phasing windings 35A, 37A, 39A, 41A, and 43A.

The selective operation of a switch mechanism 100 will then control the energization of the several windings on the poles A, B, C, D, and E from a source of electrical energy 60 so as to effect the desired operation in much the same manner as the indicator device heretofore described with reference to FIGURE 3 except that the polarity applied to the respective windings is not reversed, but is effected through the eleven-wire system, as shown in FIGURE 6.

OPERATION

In the operation of the indicator device of the present invention, when the main coil 35 and the serially connected phasing coil 35A arranged in angular spaced relation thereto are energized to call out position 1, a magnetic field is set up in the stator having a magnitude and position determined by the magnetic field created by the combined action of the main coil 35 on the pole A together with the phasing coil 35A on the pole E. This field is slightly off set from the center line of the pole A by an angle $\theta$ so that the permanent magnet rotor 75 magnetized with both North and South poles on the same axis will line up with the off-set field created by the main coil 35 and phasing coil 35A, thus positioning the drum 14 controlled by the permanent magnet 75 so as to actuate the indicator drum 14 to an adjusted position to present the numeral 1 or symbol borne thereby to view through the winding 12, as shown in FIGURE 1.

When the excitation of the main coil 35 and the serially connected phasing coil 35A is removed, the permanent magnet rotor 75 will change position by the amount of the angle $\theta$ so as to line up with the center line of the pole A. Thus, a magnetic detent action is achieved and the rotor will hold its position with the power off.

When the indicator numeral 6 is called for, the excitation of the main coil 35 on the pole A and its corresponding phasing coil 35A on the pole E is reversed, as shown by table A of FIGURE 5, so that a magnetic field will then be created in the stator 32 which is displaced one hundred and eighty degrees from that provided for displaying the number 1. This field is displaced by the angle $\theta$ from the midpoint of the pole A and in turn from the midpoint of the poles C and D by the angle $\theta$, as indicated by the dotted lines of FIGURE 3 so that angular adjustment of the indicator drum 14 from the de-energized position 1 to the energized position 6 will be effected in a clockwise direction whereupon the permanent magnet rotor 75 will line up with the field developed by the reverse energization of the main coil 35 and the phasing coil 35A. This clockwise rotation of the permanent magnet rotor 75 will be developed because of the magnetic detent action of the permanent magnet rotor 75 towards the pole A by the preceding de-energization of the main coil 35 and the phasing coil 35A which conditions the permanent magnet rotor 75 for the subsequent operation thereof.

At position 6, when the power is removed, the permanent magnet rotor 75 by the magnetic detent action thereof will again be rotated in a clockwise direction through the angle $\theta$ and align itself with the center line of pole A or the midpoint of the center line between the poles C and D.

If this magnetic detent action was not provided, the turning couple in going from position 1 to 6 would be equal in either direction resulting in an unstable equilibrium condition and hence no movement. Thus, it will be seen that, in the present invention, with the magnetic detent positions provided, the display of information may be maintained in either the energized or de-energized state and the ten indicator numbers provided on the drum 14 may be equally spaced from each other around the drum.

The six-wire system, shown in FIGURE 3, can also be operated from a common polarity source, exciting one coil for some positions and two coils of the same polarity for alternate positions. For example, position 1 may be obtained by exciting main coil 35 and its serially connected phasing coil 35A and position 6 may be positioned by energizing both main coils 39 and 41 and corresponding serially connected phasing coils 39A and 41A with the same polarity. A magnetic detent action is developed in a manner similar to that described for the indicator using alternate polarity excitation.

Operation of the eleven-wire system of FIGURE 6 with common polarity excitation may be best understood by comparing it to the operation of the six-wire system with alternating excitation, as shown in FIGURE 3.

Both the six-wire system of FIGURE 3 and the eleven-wire system of FIGURE 6 incorporate five poles but the eleven-wire system uses two main coils per pole rather than one. One of the main coils per pole produces a stator field of a particular magnitude and direction while the other main coil on the same pole is wired in such a manner as to produce an equivalent stator field displaced one hundred and eighty degrees from the other when excited from the same common polarity source.

Thus, position 1 can be obtained by exciting the main coil 35 on pole A and its serially connected phasing coil 35A on pole E, whereas the position 6 may be obtained by exciting the oppositely wound main coil 35' on pole A and serially connected to phasing coil 35A' on pole E with the same polarity by using common polarity excitation. A magnetic detent action is produced by the use of the phasing windings in the same manner as produced in the six-wire system of FIGURE 3 with alternate polarity excitation.

While several embodiments of the invention have been illustrated and described, various changes in the form and relative arrangements of the parts which will now be apparent to those skilled in the art may be made without departing from the scope of the invention. Reference is, therefore, to be had to the appended claims for a definition of the limits of the invention.

What is claimed is:

1. In an electromagnetic indicator device for displaying a plurality of discrete indicia in response to electrical energization, said indicator device being of a type including a permanent magnet rotor supported for deflection about an axis thereof to a plurality of discrete angularly spaced positions, at least one main electromagnetic coil, and the main coil being mounted at one side of said rotor axis with an axis of the coil extending radially in a direction substantially perpendicular to the axis of said rotor; the improvement comprising a secondary electromagnetic coil serially connected to the main coil and angularly spaced from the main coil by less than ninety degrees so that upon selective energization of said main coil with electrical signals of either of two opposed polarities angular movement of said permanent magnet rotor about the axis thereof may be effected from a first position to a second position, the main and secondary coils being so arranged as to produce through an interaction of magnetic fields resulting upon the energization thereof a turning moment to prevent a condition of unstable equilibrium in said rotor when it is desired to angularly position the rotor one hundred and eighty degrees, and the direction of angular movement of said permanent magnet rotor about the axis thereof being in a sense predetermined by the angular relation of the secondary coil to the main coil of less than ninety degrees.

2. In an eletcromagnetic indicator device for displaying a plurality of discrete indicia in response to electrical energization, said indicator device being of a type including a permanent magnet rotor supported for deflection about an axis thereof to a plurality of discrete angular spaced positions, a plurality of main electromagnetic coils, the main coils being positioned around magnetic cores equally angularly spaced about said rotor axis and extending radially in a direction substantially perpendicular to the axis of said rotor; the improvement comprising each of said main coils including a phasing coil serially connected thereto and positioned around one of the magnetic cores extending radially at one side thereof and in angular relation to the main coil, means to selectively energize said main and phasing coils with an electrical signal, said permanent magnet rotor being deflected to an angular position in accordance with a magnetic field generated by the energized main and phasing coils and in an angular direction dependent upon the angular position of the phasing coil in relation to the main coil so as to provide a means whereby an interaction of the magnetic field generated by said energized main and phasing coils produces a turning moment to prevent a condition of unstable equilibrium in said rotor when it is desired to angularly position the rotor to a diametrically opposite position.

3. In an electromagnetic indicator device for displaying a plurality of discrete indicia in response to electrical energization, said indicator device being of a type including a permanent magnet rotor having opopsite poles and rotatably supported for deflection about the axis thereof to a plurality of discrete angularly spaced positions, a plurality of electromagnetic main coils, the main coils being positioned about said rotor axis and around equally angularly spaced magnetic cores extending radially in a direction substantially perpendicular to the axis of said rotor, and a plurality of electrical circuits to selectively energize said coils; the combination comprising each of said circuits including a phasing coil connected in series with one of said main coils, said phasing coil being wound around one of the angularly spaced magnetic cores other than that of the selectively energized main coil, and said magnetic rotor being deflected to an angular position in accordance with the selectively enregized main coil and the polarity of such energization and in an angular sense dependent upon the relation of the phasing coil to the selectively energized main coil, so as to provide a means whereby an interaction of a magnetic field created by the selectively energized main and phasing coils produces a turning movement to prevent a condition of unstable equilibrium in said rotor when it is desired to revolve the rotor one hundred and eighty degrees.

4. In an electromagnetic indicator device for displaying ten discrete indicia in response to electrical energization, said indicator device being of a type including a casing having a viewing window therethrough, a rotory indicating member positioned within said casing and movable on an axis of rotation through ten discrete positions to display any of said ten different indicia through said window; a rotatable permanent magnet drivingly connected to said rotary member and having opposite poles, five main electromagnetic coils, the main coils being positioned about said rotary member and around equally angularly spaced magnetic cores extending radially in a direction substantially perpendicular to the axis of said rotary member; the improvement comprising five phasing coils, each of said main coils being serially connected to a different one of said five phasing coils, and each of said phasing coils being positioned around one of the magnetic cores extending radially in an immediate angular spaced relation to and at one side of the magnetic core of the serially connected main coil, said permanent magnet operable to rest in an off-center position with respect to the magnetic core of the main coil upon the selective energization of the main coil and the phasing coil serially connected thereto, and said permanent magnet being magnetically reset into alignment with the magnetic core of the main coil upon the selective de-energization of the main and phasing coils so as to condition the permanent magnet to be angularly actuated about the axis of rotation thereof in response to the selctive energization of said main and phasing coils with an opposite polarity and in an angular sense dependent upon the angular relation of the serially connected phasing coil to the selectively energized main coil.

5. In an electromagnetic indicator device for displaying ten discrete indicia in response to electrical energization, said indicator device being of a type including a casing having a viewing window therethrough, a rotary indicating member positioned within said casing and movable on an axis of rotation through ten discrete positions to display any of said ten different indicia through said window; a rotatable permanent magnet drivingly connected to said rotary member and having opposite poles; the improvement comprising ten main electromagnetic coils, five pairs of the ten main coils being positioned about said rotory member and around equally angularly spaced magnetic cores extending radially in a direction substantially perpendicular to the axis of said rotary member, the main coils of each pair being wound in an opposite direction one to the other around one of the magnetic cores, ten phasing coils, each of said ten main coils being serially connected to a different one of said ten phasing coils, pairs of said ten phasing coils being positioned around each one of the magnetic cores, the phasing coils of each pair of phasing coils being wound in an opposite direction one to the other around one of the magnetic cores, each of said phasing coils being positioned around that magnetic core extending radially in an immediate angular spaced relation to and at one side of the magnetic core of the serially connected main coil, said permanent magnet operable to rest in an off-center position with respect to the magnetic core of the main coil upon the selective energization of the main coil and the phasing coil serially connected thereto, and said permanent magnet being magnetically reset into alignment with the magnetic core of the main coil upon the selective de-energization of the main and phasing coils so as to condition the permanent magnet to be angularly actuated about the axis of rotation thereof in response to the selective energization of other of said main and phasing coils and in an angular sense dependent upon the angular relation of the serially connected phasing coil to the selectively energized main coil.

6. In an electromagnetic indicator device for displaying N discrete indicia in response to electrical energization, said indicator device being of a type including a rotary indicating member movable on an axis of rotation through N discrete positions to display any of said N different indicia; a rotatable permanent magnet drivingly connected to said rotary member and having opposite poles, $N/2$ main electromagnetic coils, the main coils being positioned about said rotary member and around angularly spaced magnetic cores extending radially in a direction substantially perpendicular to the axis of said rotary member; the improvement comprising $N/2$ phasing coils, each of said main coils being serially connected to a different one of said $N/2$ phasing coils, and each of said phasing coils being positioned around one of the magnetic cores extending radially in an angular spaced relation to and at one side of the magnetic core of the serially connected main coil, said permanent magnet operable to rest in an off-center position with respect to the magnetic core of the main coil upon the selective energization of the main coil and the phasing coil serially connected thereto, and said permanent magnet being magnetically reset into alignment with the magnetic core of the main coil upon the selective deenergization of the main and phasing coils so as to condition the permanent magnet to be angularly actuated about the axis of rotation thereof in response to the selective energization of said main and phasing coils with an opposite polarity and in an angular sense dependent upon the angular relation of the serially connected phasing coil to the selectively energized main coil.

References Cited by the Examiner

UNITED STATES PATENTS

| | | | |
|---|---|---|---|
| 2,477,993 | 8/1949 | Lewis | 310—49 X |
| 2,765,433 | 10/1956 | Lilinstein | 310—49 X |
| 3,109,167 | 10/1963 | MacIntyre et al. | 340—325 |

NEIL C. READ, *Primary Examiner.*

I. J. LEVIN, *Assistant Examiner.*